United States Patent
Karalis et al.

(10) Patent No.: US 10,536,556 B2
(45) Date of Patent: Jan. 14, 2020

(54) AUTOMATION OF BROWSING MODE SWITCHING

(71) Applicant: Microsoft Technology Licensing, LLC, Redmond, WA (US)

(72) Inventors: George S. Karalis, Seattle, WA (US); Mark Yalovsky, Seattle, WA (US); Swathi Ganapathi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 15/159,256

(22) Filed: May 19, 2016

(65) Prior Publication Data

US 2017/0339248 A1 Nov. 23, 2017

(51) Int. Cl.
*H04L 29/08* (2006.01)

(52) U.S. Cl.
CPC ............ *H04L 67/327* (2013.01); *H04L 67/02* (2013.01)

(58) Field of Classification Search
CPC . G06F 21/6245; G06F 21/6263; H04L 67/02; H04L 63/1433
See application file for complete search history.

(56) References Cited

U.S. PATENT DOCUMENTS

| | | | |
|---|---|---|---|
| 8,402,011 B1 * | 3/2013 | Bodenhamer | G06F 16/986 707/706 |
| 8,464,350 B2 | 6/2013 | Kanevsky et al. | |
| 8,499,341 B2 | 7/2013 | Celebisoy | |
| 8,935,798 B1 * | 1/2015 | Smith | G06F 16/00 726/26 |
| 9,166,982 B1 | 10/2015 | Etesse | |
| 9,203,850 B1 | 12/2015 | Chen et al. | |
| 9,692,777 B2 * | 6/2017 | Gjonej | G06F 21/6245 |
| 2010/0005053 A1 * | 1/2010 | Estes | G06F 16/955 707/E17.001 |
| 2012/0240237 A1 * | 9/2012 | Kanevsky | G06F 16/957 726/26 |
| 2013/0167045 A1 * | 6/2013 | Xu | G06F 21/6263 715/760 |
| 2014/0289806 A1 | 9/2014 | Yang et al. | |
| 2015/0026815 A1 | 1/2015 | Barrett | |
| 2015/0143544 A1 * | 5/2015 | Lu | H04L 63/10 726/29 |

(Continued)

FOREIGN PATENT DOCUMENTS

CN 103955459 A 7/2014

OTHER PUBLICATIONS

Kywe, et al., "PrivateDroid: Private Browsing Mode for Android", In Proceedings of IEEE 13th International Conference on Trust, Security and Privacy in Computing and Communications, Sep. 24, 2014, pp. 27-36.

(Continued)

*Primary Examiner* — Aftab N. Khan

(57) ABSTRACT

Techniques for automation of browsing mode switching are described. According to various implementations, a web browser is operable in multiple different browsing modes, including a normal browsing mode and a private browsing mode. Techniques described herein enable automatic switching between browsing modes based on different mode triggers, and enable user configuration of various mode change behaviors.

19 Claims, 13 Drawing Sheets

(56) References Cited

U.S. PATENT DOCUMENTS

2015/0332065 A1 11/2015 Li et al.

OTHER PUBLICATIONS

"International Search Report and Written Opinion", Application No. PCT/US2017/031466, dated Jul. 28, 2017, 13 pages.
Wang, "SafeFox: a Safe Lightweight Virtual Browsing Environment", Proceedings of the 43rd Hawaii International Conference on System Sciences—2010, Jan. 5, 2010, 2010, 10 pages.

* cited by examiner

AUTOMATION OF BROWSING MODE SWITCHING

BACKGROUND

Today's connected environment provides individuals with access to a variety of online content. For instance, a user of a client device such as a mobile device or desktop computer can utilize the client device to browse the Internet and consume a vast array of different websites. Some websites, however, include content that a user may not want associated with the user's identity or with their device. Thus, many web browsers include a "private mode" that enables a user to view a website while minimizing data that is retained that can be used to indicate that the user visited the website. Typical private mode implementations, however, require a user to proactively initiate the private mode in a browser before visiting a website which is to be scrubbed from a device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for automation of browsing mode switching are described. According to various implementations, a web browser is operable in multiple different browsing modes, including a normal browsing mode and a private browsing mode. Techniques described herein enable automatic switching between browsing modes based on different mode triggers, and enable user configuration of various mode change behaviors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
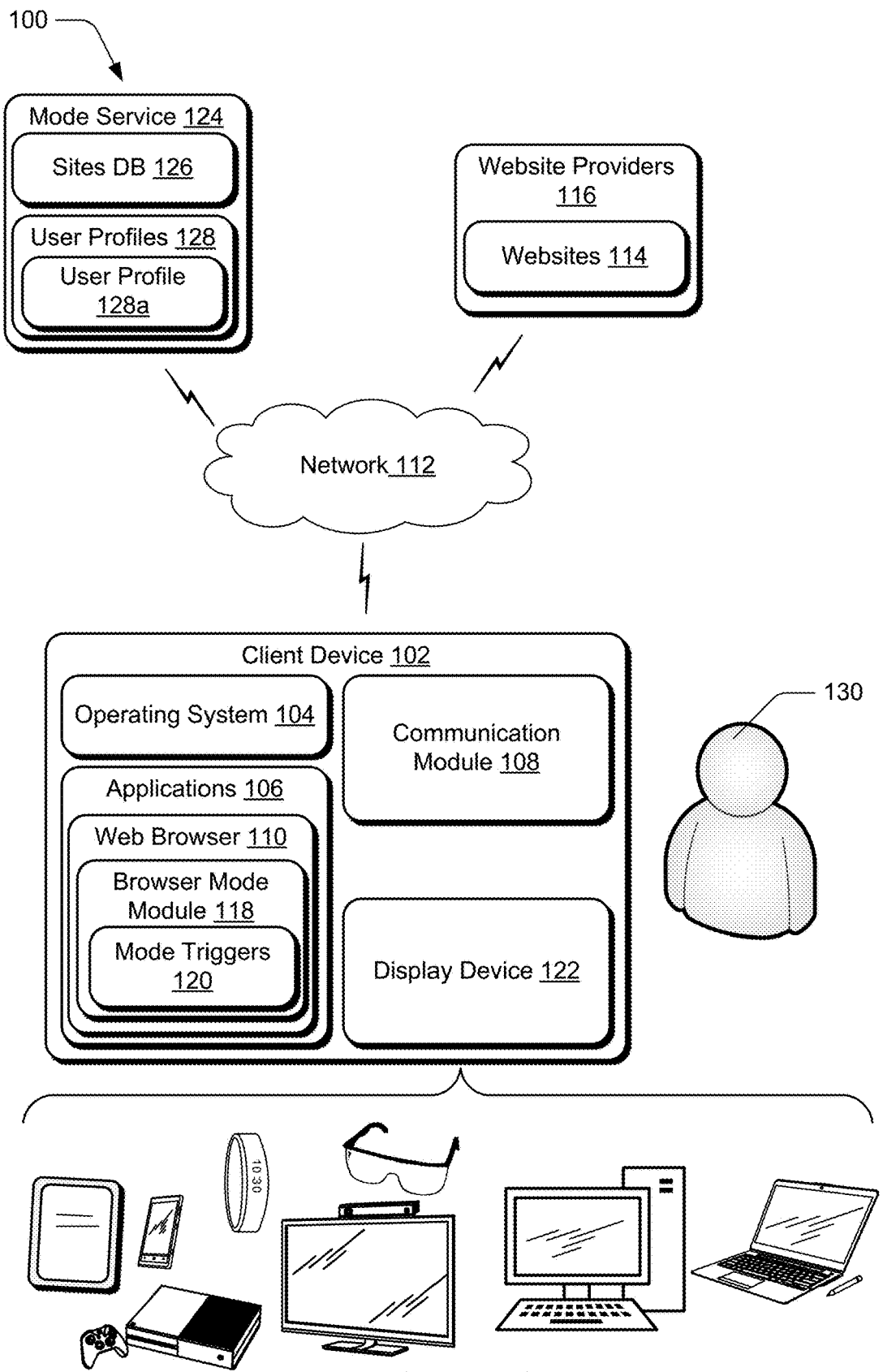
FIG. 1 is an illustration of an environment in an example implementation that is operable to employ techniques discussed herein in accordance with one or more embodiments.

Techniques for automation of browsing mode switching are described. According to various implementations, a web browser is operable in multiple different browsing modes, include a normal browsing mode and a private browsing mode. In a normal browsing mode, site-related data for a website is collected and cached on a browsing device such that the site-related data can be retrieved to provide a record of user interactions with the website. Further, when a website is visited in a normal browsing mode, the website visit is recorded in a browsing history of a web browser.

In contrast, in a private browsing mode site-related data is typically not collected and cached on a browsing device. Further, when a website is visited in a private browsing mode, the website visit is not recorded in a browsing history of a web browser. According to implementations for automation of browsing mode switching described herein, techniques are described for automatically switching between different browsing modes, such as switching between a normal browsing mode and a private browsing mode. These particular modes are presented for purpose of example only, and a variety of other browsing modes may be employed, examples of which are described below.

According to various implementations, a mode change trigger is detected that indicates that a switch between browsing modes is to occur. A mode change trigger can take various forms, such as detection of a particular type of content associated with a website, user configuration of a mode change trigger, a network service that defines different mode change triggers, and so forth. In at least some implementations, in response to detecting a mode change trigger, a change in browsing modes automatically occurs without explicit user input to change browsing modes.

For instance, consider a scenario where a user navigates a web browser that is in a normal browsing mode to a website known to be associated with adult-oriented content. A web browser detects that the website represents a mode change trigger to a private browsing mode, and thus automatically switches the browser to the private browsing mode and browses to the website. Accordingly, a user is not required to manually switch browsing modes for a change in browsing mode to occur. For instance, a change in browsing mode occurs automatically and in response to detecting a mode change trigger.

According to various implementations, different mode configuration experiences are presented. For instance, different graphical user interfaces (GUIs) and selectable options are presented that enable a user to customize different browsing mode behaviors. A user, for example, can specify different browsing modes for content with different risk levels, specific browsing modes for specific websites, and so forth. Thus, techniques described herein provide an automated and customizable browsing experience that enables switching between different browsing modes based on a variety of different criteria. In at least some implementations, this protects a user from inadvertently causing site-related data for high-risk sites to be collected, such as by automatically switching to a private browsing mode when the user browses to a high-risk site. Further, sensitive data exposed by a website and user/device data exposed to a website may be protected by automatically switching to a private browsing mode for the website such that the sensitive data is not collected and/or cached by a browsing device.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for automation of browsing mode switching discussed herein. Environment 100 includes a client device 102 which can be embodied as any suitable device such as, by way of example and not limitation, a smartphone, a tablet computer, a portable computer (e.g., a laptop), a desktop computer, a wearable device, an Internet of Things ("IoT") device, and so forth. Thus, the client device 102 may range from a system with significant processing power, to a lightweight device with minimal processing power. One of a variety of different examples of a client device 102 is shown and described below in FIG. 13.

The client device 102 includes a variety of different functionalities that enable various activities and tasks to be performed. For instance, the client device 102 includes an operating system 104, applications 106, and a communication module 108. Generally, the operating system 104 is representative of functionality for abstracting various system components of the client device 102, such as hardware, kernel-level modules and services, and so forth. The operating system 104, for instance, can abstract various components (e.g., hardware, software, and firmware) of the client device 102 to the applications 106 to enable interaction between the components and the applications 106.

The applications 106 represents functionalities for performing different tasks via the client device 102. Examples of the applications 106 include a word processing application, a spreadsheet application, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The applications 106 include a web browser 110, which is representative of functionality to enable the client device 102 to browse a network 112 to access websites 114 implemented by website providers 116. As used herein, the term "website" refers to a variety of different network locations, such as websites openly available via the Internet, private network locations that are access controlled, local network locations that reside on private networks such as a local area network ("LAN") and/or a corpnet, and so forth. Generally, the network 112 is representative of a combination of different instances of wired and wireless networks, such as the Internet. Further to techniques for automation of browsing mode switching described herein, the web browser 110 includes a browsing mode module ("mode module") 118, which is representative of functionality to enable the web browser 110 to switch between different browsing modes, as further detailed herein.

The mode module 118, for instance, maintains and/or has access to mode triggers 120, which represents a collection of different types and instances of data that can trigger a change in mode for the web browser 110. For example, the mode triggers 120 identify different websites that can trigger a change in the web browser 110 from a normal browsing mode to a private browsing mode. Generally, the mode triggers 120 may identify websites in different ways, such as with reference to a specific uniform resource locator ("URL") for a website, a hostname for a website, a particular web domain, and so forth. Alternatively or additionally, the mode triggers 120 can specify different subject matter categorizations for websites, such as websites with adult-oriented content, websites that involve personal user information (e.g., personally identifiable information, financial information, health information, educational information, and so forth), websites that involve protected enterprise data, and so forth. Thus, the mode triggers 120 may be defined in a variety of different ways to enable various navigation mode transitions for the web browser 110.

The communication module 108 is representative of functionality for enabling the client device 102 to communicate over wired and/or wireless connections. For instance, the communication module 108 represents hardware and logic for communication via a variety of different wired and/or wireless technologies and protocols.

The client device 102 further includes a display device 122, which generally represents functionality for visual output for the client device 102. Additionally, the display device 122 represents functionality for receiving various types of input, such as touch input, pen input, and so forth.

The environment 100 further includes a mode service 124 with which the client device 102 may communicate over the network 112. The mode service 124 is representative of a network-based functionality (e.g., a cloud service) that may be leveraged to perform various aspects of automation of browsing mode switching described herein. The mode service 124, for instance, maintains a trigger sites database ("site DB") 126 and user profiles 128. The site DB 126 is representative of functionality to monitor different websites that are known to be associated with mode change triggers, such as to trigger from a normal browsing mode to a private browsing mode for the web browser 110. Similarly to the mode triggers 120, the site DB 126 may identify specific websites that are known to be associated with a mode change trigger, and/or may specify different subject matter categorizations for websites that are known to be associated with a mode change trigger.

In at least some implementations, websites listed in the site DB 126 can be identified based on user behaviors pertaining to specific websites. For instance, if a threshold number/percentage of users indicate that a certain website it to be viewed in a private browsing mode, the website is added to the site DB 126 as a candidate to trigger a mode change to a private browsing mode.

The user profiles 128 are representative of browsing profiles for different users, such as a user 130 of the client device 102. The user profiles 128, for instance, identify websites for specific users that are to trigger a mode change for web browsing. The user profiles 128 include a user profile 128a for the user 130, which identifies specific websites that are to cause a browsing mode change for the web browser 110. Generally, the user profile 128a can be generated and updated in various ways, such as based on websites identified in the site DB 126, browsing habits of the user 130, input from the user 130 specifying that a website is to cause a change in browsing mode, and so forth. According to various implementations, the user profile 128a is portable such that when the user 130 is determined to be browsing the web on a device other than the client device 102, mode change triggers identified in the user profile 128a can be applied. Thus, mode triggers may be defined in various ways and by various entities, such as by the mode module 118, the mode service 124, and so forth.

Having described an example environment in which the techniques described herein may operate, consider now a discussion of some example implementation scenarios in accordance with one or more embodiments.

Example Implementation Scenarios

This section describes some example implementation scenarios for automation of browsing mode switching in accordance with one or more implementations. The implementation scenarios may be implemented in the environment 100 described above, the system 1300 of FIG. 13, and/or any other suitable environment. The implementation scenarios and procedures, for example, describe example operations of the client device 102 and/or the mode service 124. In the scenarios, reference is made to features introduced in FIG. 1 but not expressly illustrated in the scenarios. While the implementation scenarios and procedures are discussed with reference to a particular application, it is to be appreciated that techniques for automation of browsing mode switching discussed herein are applicable across a variety of different applications, services, and environments. In at least some embodiments, steps described for the various procedures are implemented automatically and independent of user interaction.

Figure 2:
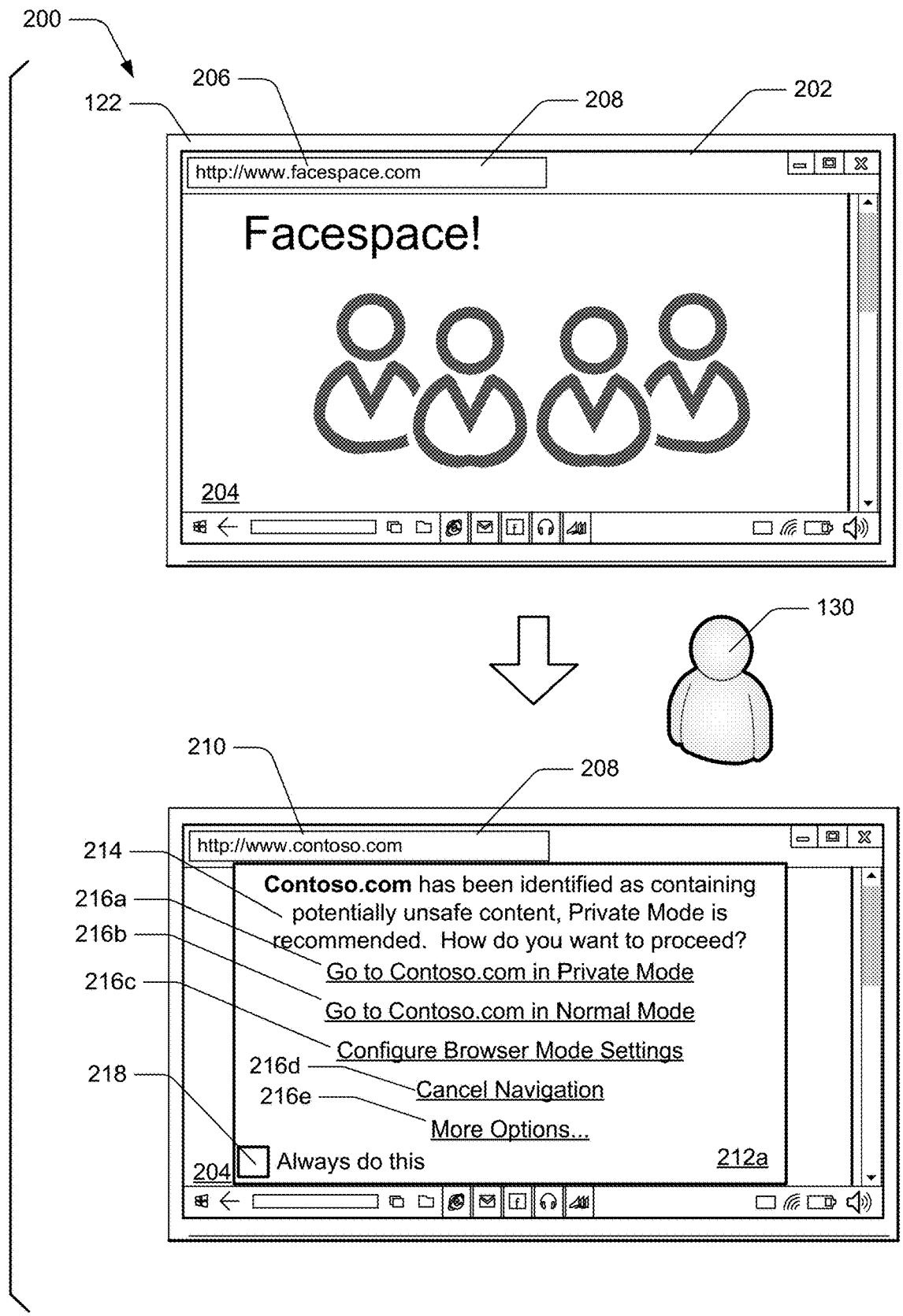
FIG. 2 depicts an example implementation scenario for detecting a mode change trigger in accordance with one or more embodiments.

FIG. 2 depicts an example implementation scenario 200 for detecting a mode change trigger in accordance with one or more implementations. The upper portion of the scenario 200 includes a browser graphical user interface (GUI) 202 for the web browser 110 displayed on the display device 122 of the client device 102. The browser GUI 202 displays a web page 204 for a website 206 ("facespace.com") identified in an address region 208 of the browser GUI 202.

Proceeding to the lower portion of the scenario 200, the user 130 initiates a navigation of the web browser 110 to a different website 210, i.e., "contoso.com." Generally, the user 130 may initiate the navigation in various ways, such as by entering a web address into the address region 208, selecting a hyperlink for the website 210, and so forth. In response to the attempted navigation to the website 210, the mode module 118 detects that the website 210 is associated with potentially unsafe content. The mode module 118, for instance, detects that the website 210 includes content that is known to cause a mode change from a normal browsing mode to a private browsing mode. Alternatively or additionally, the mode service 124 detects that the website 210 is associated with potentially unsafe content, and notifies the mode module 118 as such.

Accordingly, before allowing the navigation to the website 210 to proceed, the mode module 118 presents a mode GUI 212a that prompts the user 130 for instructions pertaining to the requested navigation to the website 210. The mode GUI 212a includes a notification 214 that notifies the user 130 that the website 210 is identified as including unsafe content, and prompts the user 130 for instructions on how to proceed. The mode GUI 212a further includes different selectable options that are selectable to cause different actions to occur in relation to the requested navigation to the website 210. Each of these options is generally described below:

Selectable option 216a—this option is selectable to cause the web browser 110 to switch to a private browsing mode and navigate to the website 210 in the private browsing mode.

Selectable option 216b—this option is selectable to cause the web browser 110 to stay in a normal browsing mode and to navigate to the website 210 in the normal browsing mode.

Selectable option 216c—this option is selectable to cause a browsing mode configuration experience to be presented, examples of which are discussed below. In at least some implementations, selecting the selectable option 216c causes a browsing mode configuration experience to be launched while the web browser 110 remains at the website 206, e.g., without navigating to the website 210.

Selectable option 216d—this option is selectable to cancel the requested navigation to the website 210. For instance, selecting the selectable option 216d causes the navigation to the website 210 to be cancelled and the web browser 110 to stay at the website 206.

Selectable option 216e—this option is selectable to cause more selectable options to be presented that pertain to the requested navigation to the website 210.

The mode GUI 212a further includes a repeat option 218, which is selectable to cause an action performed in response to selection of one of the selectable options 216a-216d to be repeated in response to a subsequent navigation to the website 210. For instance, if the user selects the repeat option 218 (e.g., by checking the checkbox) and then selects one of the selectable options 216a, 216b, the action performed in response to selection of the selectable option will be automatically repeated in response to a subsequent navigation of the web browser 110 to the website 210, e.g., without querying the user 130 for instructions regarding navigation to the website 210.

Alternatively or additionally to the selectable options 216a-216d, other options pertaining to the requested navigation to the website 210 may be presented. For instance, consider the following example scenario.

Figure 3:
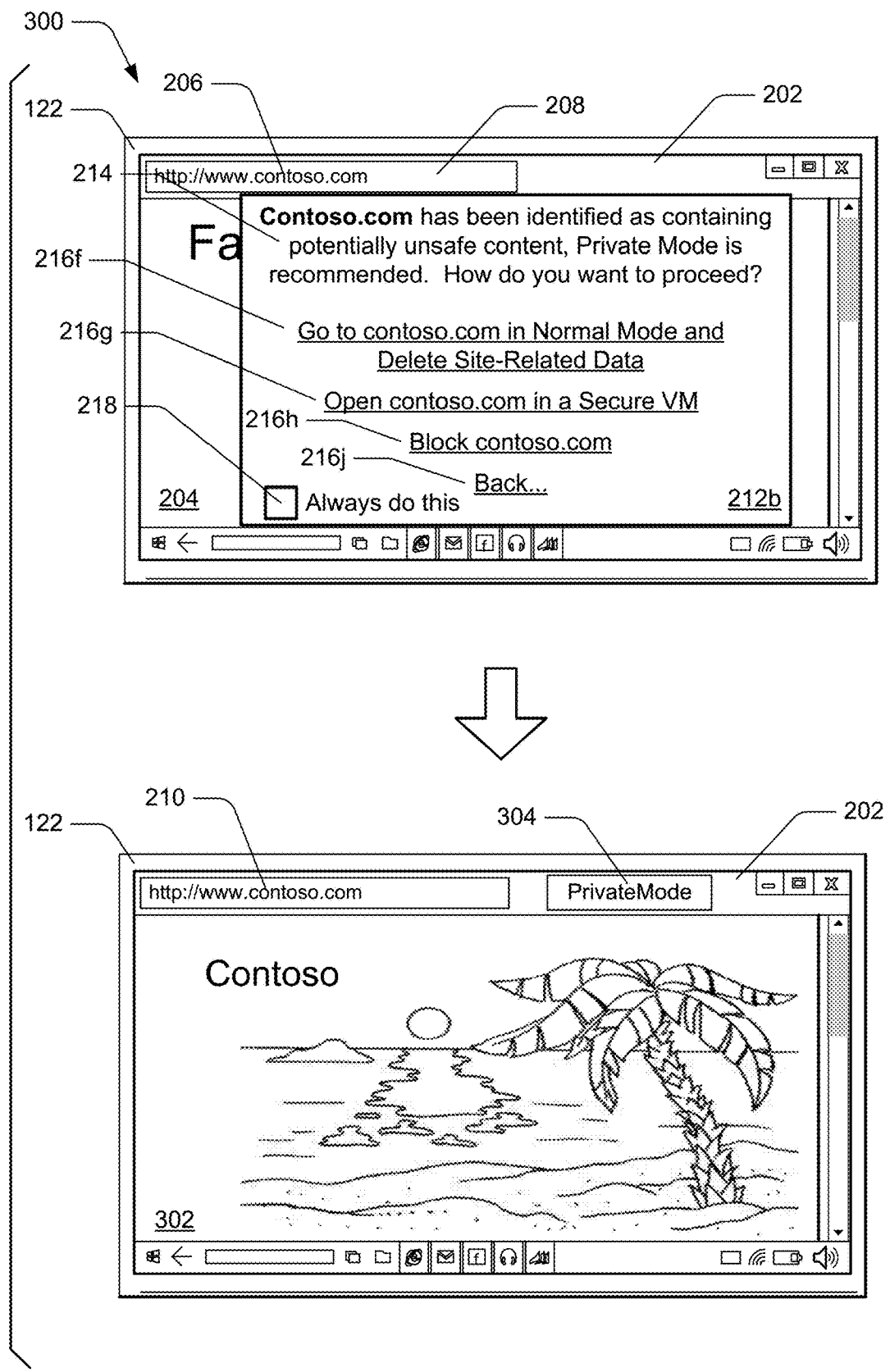
FIG. 3 depicts an example implementation scenario for presenting selectable options for a browsing mode change in accordance with one or more embodiments.

FIG. 3 depicts an example implementation scenario 300 for presenting selectable options for a browsing mode change in accordance with one or more implementations. The scenario 300, for instance, represents a continuation and/or variation of the scenario 200 discussed above.

The scenario 300 includes the display device 122 of the client device 102. The display device 122 displays the browser GUI 202 with the web page 204 for the website 206. Also displayed is a mode GUI 212b which includes the notification 214 and different selectable options pertaining to the requested navigation to the website 210, which is introduced above with reference to the scenario 200. In at least some implementations, the mode GUI 212b is presented in response to user selection of the selectable option 216e, e.g., the "More Options" selectable option. Alternatively or additionally, the mode GUI 212b represents an alternative implementation to the mode GUI 212a described above.

The selectable options within the mode GUI 212b include the following:

Selectable Option 216f—this option is selectable to cause the web browser 110 to navigate to the website 210 in a normal browsing mode and to delete site-related data after navigating away from the website 210. For instance, selection of the selectable option 216f causes the web browser 110 to navigate to the website 210 in a normal browsing mode. When the web browser 110 subsequently navigates to another website and/or is closed, site-related data for the website 210 is deleted. Examples of site-related data include data that is cached for the website 210, browsing history that identifies the website 210, cookies and/or other tracking data for the website 210, user information that is input to the website 210, and so forth.

Selectable Option 216g—this option is selectable to cause the website 210 to be opened within a secure virtual machine ("VM"). For instance, selecting the selectable option 216g causes a web browser within a secure VM to be navigated to the website 210. In at least some implementations, selecting the selectable option 216g causes a secure VM to be instantiated, a web browser to be launched within the secure VM, and the web browser to be navigated to the website 210 all without further user input after selecting the selectable option 216g. Generally, a secure VM represents a VM that is protected from unauthorized access by parties external to the client device 102. Further, a secure VM provides a contained sandbox such that malicious content from external parties stays within the sandbox and doesn't infect or affect the client machine, e.g., the client device 102. According to one or more implementations, when the secure VM is closed, browsing history and/or other site-related data for the website 210 is deleted.

Selectable Option 216h—this option is selectable to block navigation of the web browser 110 to the website 210. For instance, selecting the selectable option 216h causes the current navigation to the website 210 to be cancelled, and causes the website 210 to be added to a blocked websites list such that a subsequent request to navigate the web browser 110 to the website 210 is automatically blocked without express user input.

Selectable Option 216j—this option is selectable to navigate back to the mode GUI 212a described above in the scenario 200.

The mode GUI 212b further includes the repeat option 218, which is selectable to cause an action performed in response to selection of one of the selectable options 216f-216h to be repeated in response to a subsequent navigation to the website 210.

Continuing to the lower portion of the scenario 300, the user 130 selects the selectable option 216a, and thus the web browser 110 switches to a private browsing mode and navigates to the website 210. Thus, a web page 302 for the website 210 is displayed within the browser GUI 202.

Further, a private mode indicator 304 is presented as a visual indicator that the web browser 110 is currently in the private browsing mode.

Figure 4:
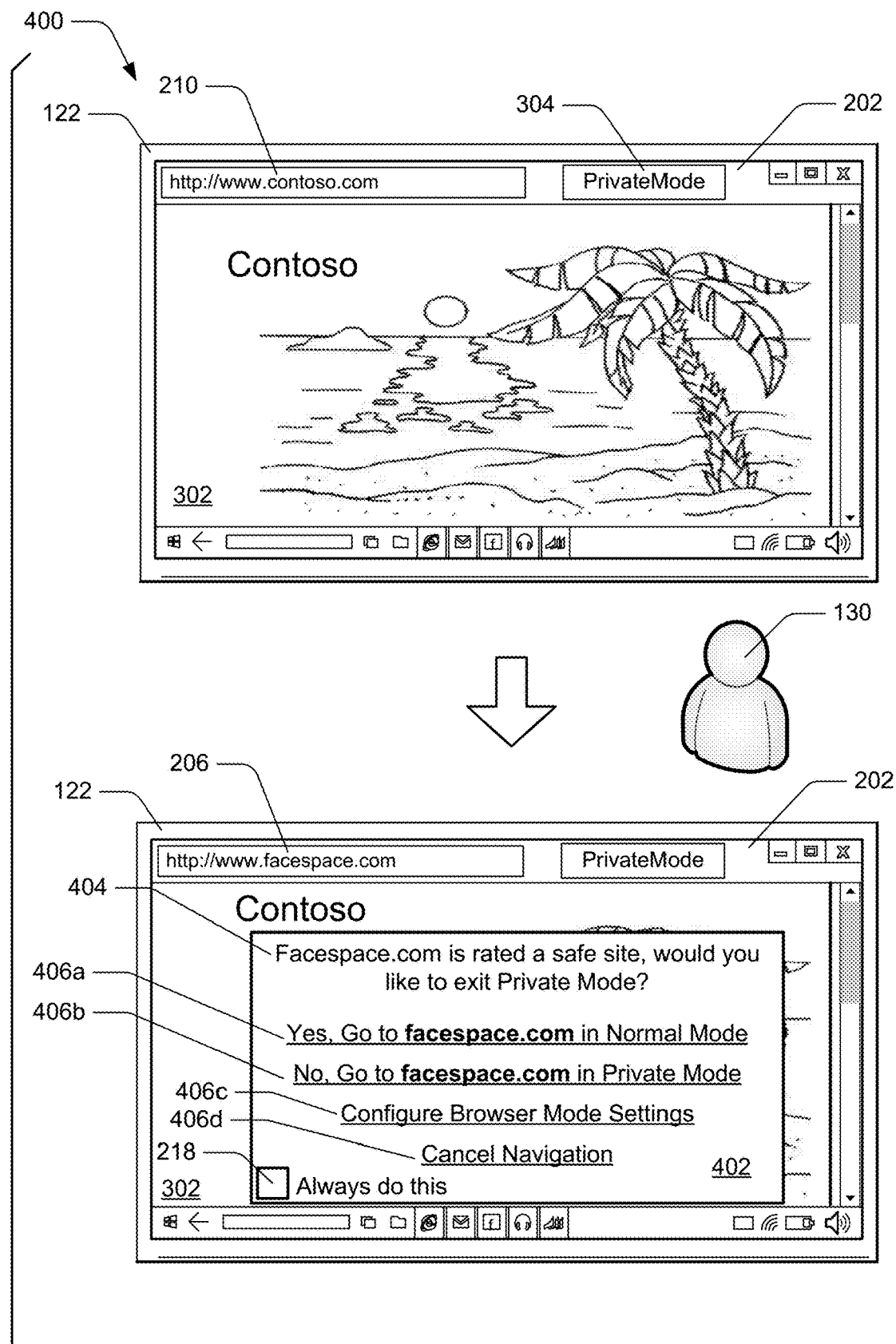
FIG. 4 depicts an example implementation scenario for presenting selectable options for a browsing mode change in accordance with one or more embodiments.

FIG. 4 depicts an example implementation scenario 400 in accordance with one or more implementations. The scenario 400, for instance, represents a continuation and/or variation of the scenarios 200, 300 discussed above.

The upper portion of the scenario 400 includes the display device 122 of the client device 102. The display device 122 displays the browser GUI 202 with the web page 302 for the website 210. As indicated by the private mode indicator 304, the web browser 110 is presenting the web page 302 in a private browsing mode.

Proceeding to the lower portion of the scenario 400, the user 130 initiates a navigation of the web browser 110 from the website 210 to the website 206, i.e., "facespace.com." In response to the attempted navigation to the website 206, the mode module 118 detects that the website 206 is associated with safe content, e.g., that the website 206 is rated as a safe website. The mode module 118, for instance, detects that the website 210 includes content that is known to include safe content.

Accordingly, before navigating to the website 206, the mode module 118 presents a mode GUI 402 that prompts the user 130 for instructions pertaining to the requested navigation to the website 206. The mode GUI 402 includes a notification 404 that notifies the user 130 that the website 206 is identified as including safe content, and prompts the user 130 for instructions on how to proceed. The mode GUI 402 further includes different selectable options, including:

Selectable option 406a—this option is selectable to cause the web browser 110 to navigate to the website 206 in a normal browsing mode. Selecting the selectable option 406a, for example, causes the web browser 110 to switch from the private browsing mode to the normal browsing mode, and to navigate to the website 206 in the normal browsing mode.

Selectable option 406b—this option is selectable to cause the web browser 110 to navigate to the website 206 in a private browsing mode, e.g., to say in the private browsing mode and navigate to the website 206.

Selectable option 406c—this option is selectable to cause a browsing mode configuration experience to be presented, examples of which are discussed below. In at least some implementations, selecting the selectable option 406c causes a browsing mode configuration experience to be launched while the web browser 110 remains at the website 210, e.g., without navigating to the website 206.

Selectable option 406d—this option is selectable to cancel the requested navigation to the website 206. For instance, selecting the selectable option 406d causes the navigation to the website 206 to be cancelled and the web browser 110 to stay at the website 210.

The mode GUI 212a further includes the repeat option 218, which is selectable to cause an action performed in response to selection of one of the selectable options 406a, 406b to be repeated in response to a subsequent navigation to the website 206. For instance, if the user selects the repeat option 218 (e.g., by checking the checkbox) and then selects one of the selectable options 406a, 406b, the action performed in response to selection of the selectable option will be automatically repeated in response to a subsequent navigation of the web browser 110 to the website 206, e.g., without querying the user 130 for instructions regarding navigation to the website 206.

Figure 5:
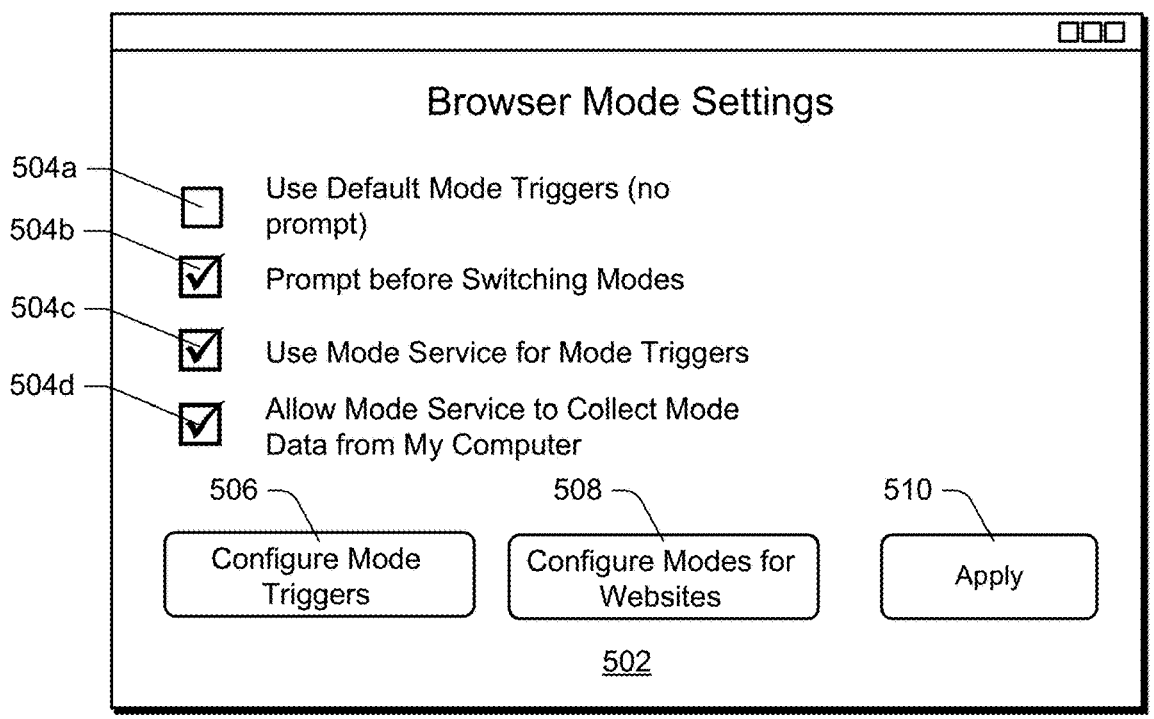
FIG. 5 depicts an example implementation scenario for a mode configuration experience in accordance with one or more embodiments.

FIG. 5 depicts an example implementation scenario 500 in accordance with one or more implementations. According to various implementations, the scenario 500 represents an example scenario for browsing mode configuration. The scenario 500, for instance, represents a continuation and/or variation of the scenarios 200-400 discussed above.

The scenario 500 includes a mode configuration GUI ("configuration GUI") 502 that enables a user to configure various browsing mode parameters. According to various implementations, the configuration GUI 502 is presented in response to various events, such as a user selection of the selectable option 216c and/or the selectable option 406c, discussed above.

The configuration GUI 502 includes different configuration options for configuring browsing mode settings, including:

Configuration option 504a—this option is selectable to cause the mode module 118 to apply default mode triggers for web browsing by the web browser 110. Default mode triggers, for instance, are defined by the mode triggers 120 and/or the mode service 124.

Configuration option 504b—this option is selectable to cause the mode module 118 to prompt a user for instructions before switching browsing modes. Examples of different user prompts are discussed above, such as the mode GUIs 212a, 212b.

Configuration option 504c—this option is selectable to allow the mode module 118 to interface with the mode service 124 to assist in determining whether to switch between browsing modes. The mode module 118, for instance, can obtain information about different websites from the mode service 124, such as information used to populate the mode triggers 120. Alternatively or additionally, the mode module 118 can query the mode service 124 with identifiers for websites, and the mode service 124 can respond to the mode module 118 specifying whether the websites are known to be associated with safe or unsafe content. In at least some implementations, if the configuration option 504c is not selected, the mode module 118 will not interface with the mode service 124 to obtain mode-related data.

Configuration option 504d—this option is selectable to allow the mode service 124 to collect mode data from the client device 102. For instance, if the configuration option 504d is selected, the mode module 118 can communicate mode data to the mode service 124. In at least some implementations, mode data includes data pertaining to user behavior when browsing the web, such as modes selected by the user 130 for navigating to different websites. The mode service 124 can use the mode data to configure and/or update the user profile 128a for the user 130, and to update mode-related data maintained by the mode service 124 to be applied for other users serviced by the mode service 124.

The configuration GUI 502 also includes a mode triggers control 506, a website modes control 508, and an apply control 510. The mode triggers control 506 is selectable to cause a mode triggers configuration experience to be presented, an example of which is detailed below. Further, the website modes control 508 is selectable to cause a website modes configuration experience to be presented, an example of which is also detailed below.

The apply control 510 is selectable to apply configuration settings specified in the configuration GUI 502. For instance, selecting the apply control 510 causes the mode module 118 to apply configuration settings specified in the configuration GUI 502, and causes the configuration GUI 502 to be removed, e.g., "torn down."

Figure 6:
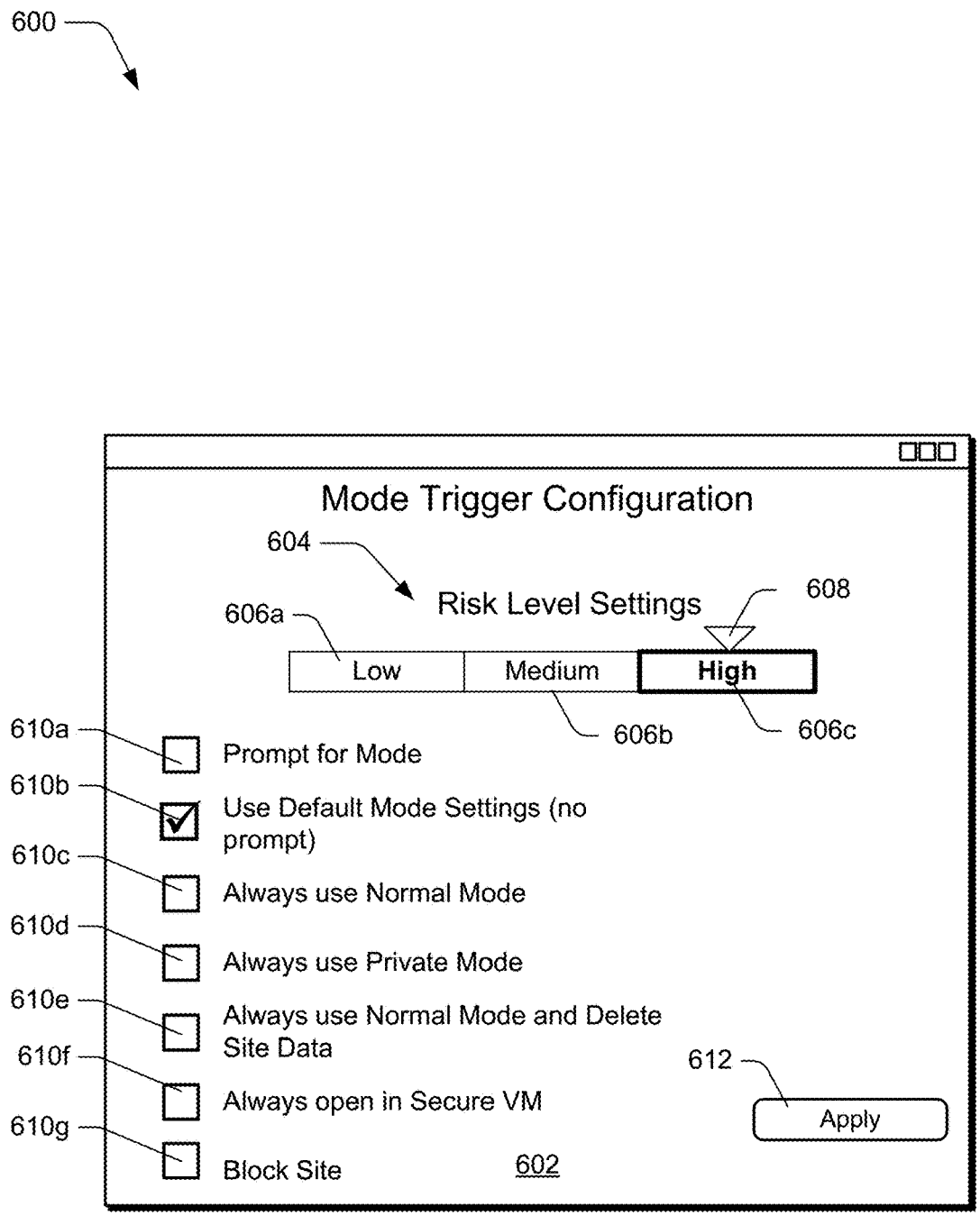
FIG. 6 depicts an example implementation scenario for a mode configuration experience in accordance with one or more embodiments.

FIG. 6 depicts an example implementation scenario 600 in accordance with one or more implementations. According to various implementations, the scenario 600 represents an example scenario for a mode triggers configuration experience. The scenario 600, for instance, represents a continuation and/or variation of the scenarios 200-500 discussed above.

The scenario 600 includes a mode triggers configuration GUI ("triggers GUI") 602 that enables a user to configure various mode trigger parameters. According to various implementations, the triggers GUI 602 is presented in response to various events, such as a user selection of the mode triggers control 506.

The triggers GUI 602 includes a risk level control 604 which enables a user to specify a particular risk level to be configured via the triggers GUI 602. In this particular example, the risk level control 604 includes a low region 606a, a medium region 606b, and a high region 606c. The low region 606a, for instance, represents web content that has a low risk level, i.e., that is categorized as being associated with known safe subject matter. The medium region 606b represents web content that has a medium risk level, i.e., that is categorized as having a medium risk of having unsafe subject matter. The high region 606c represents web content that has a high risk level, i.e., that is categorized as having a high risk of having unsafe subject matter. Generally, unsafe subject matter may be defined in various ways, such as adult-oriented content, websites that involve personal user information (e.g., personally identifiable information, financial information, health information, educational information, and so forth), websites that involve protected enterprise data, and so forth.

Generally, web content may be rated in various ways. For instance, users may provide feedback that indicates whether particular websites have a particular risk level, such as based on user experience at the websites. Further, search engines and other network algorithms can crawl the web and use different content analytics techniques to identify and categorize content on different websites, such as using language recognition analysis, image recognition analysis, and so forth. In at least some implementations, the mode service 124 maintains risk ratings for different websites as part of the site DB 126. The mode module 118 may also track risk ratings for different websites, such as received from the mode service 124.

The user 130 may select a risk level for configuration in various ways. For instance, the user may select one of the low region 606a, the medium region 606b, or the high region 606c to configure trigger settings for corresponding web content. Alternatively or additionally, the user 130 may manipulate a slider 608 along the risk level control 604 to select a particular risk level to configure.

The triggers GUI 602 further includes different configuration options for configuring mode triggers settings for different risk levels, including:

Configuration option 610a—this option is selectable to cause a prompt for use instructions to be provided when a navigation to a website associated with a specified risk level is initiated. Examples of different user prompts are discussed above, such as the mode GUIs 212a, 212b, 402.

Configuration option 610b—this option is selectable to apply default mode trigger settings for different risk levels. Default mode trigger settings, for instance, are defined by the mode triggers 120 and/or the mode service 124.

Configuration option 610c—this option is selectable to specify that a normal browsing mode is to be used to navigate to websites with a specified risk level.

Configuration option 610*d*—this option is selectable to specify that a private browsing mode is to be used to navigate to websites with a specified risk level.

Configuration option 610*e*—this option is selectable to specify that a normal browsing mode is to be used to navigate to websites with a specified risk level, and that site-related data for the websites is to be deleted.

Configuration option 610*f*—this option is selectable to specify that websites with a specified risk level are to be opened in a secure VM. Different implementations and attributes of opening websites in a secure VM are discussed above.

Configuration option 610*g*—this option is selectable to block websites with a specified risk level.

The triggers GUI 602 further includes an apply control 612, which is selectable to apply different trigger configuration settings specified in the triggers GUI 602.

According to various implementations, the settings specified in the different configuration options of the triggers GUI 602 are applied to a specific risk level specified in the risk level control 604. For instance, in this particular example the high region 606*c* is selected, such as indicated by the position of the slider 608. Thus, one or more selected configuration options are applied to websites identified as being associated with high risk content. The user may similarly configure different configuration options for the medium region 606*b* and the low region 606*a*, such that each risk level may have a different trigger behavior. Accordingly, using the triggers GUI 602, a user may provide custom triggers behaviors for web content of different risk levels.

Figure 7:
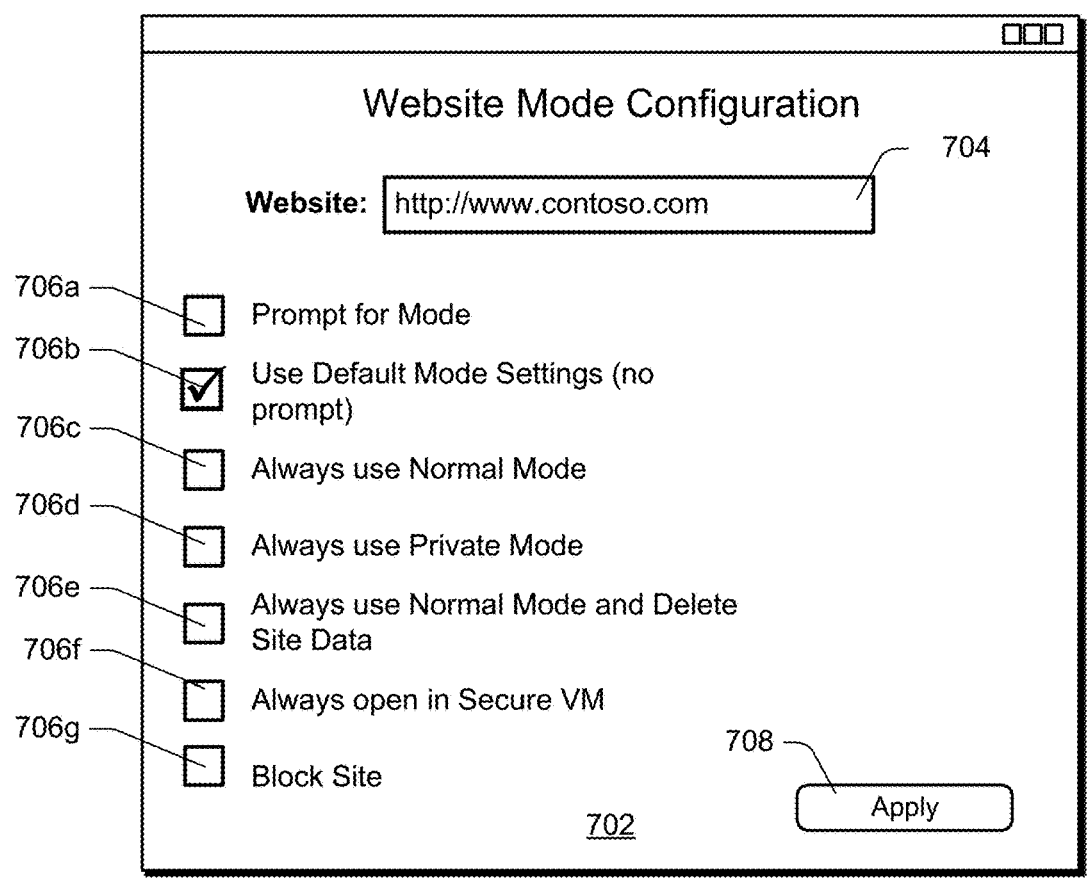
FIG. 7 depicts an example implementation scenario for a mode configuration experience in accordance with one or more embodiments.

FIG. 7 depicts an example implementation scenario 700 in accordance with one or more implementations. According to various implementations, the scenario 700 represents an example scenario for a website modes configuration experience. The scenario 700, for instance, represents a continuation and/or variation of the scenarios 200-600 discussed above.

The scenario 700 includes a website mode configuration GUI ("website mode GUI") 702 that enables a user to configure various website mode parameters. According to various implementations, the website mode GUI 702 is presented in response to various events, such as a user selection of the website modes control 508.

The website mode GUI 702 includes a website identifier ("ID") region 704 that identifies a website for which browsing modes are configured via the website mode GUI 702. A website may be populated to the website ID region 704 in various ways, such as a user manually entering a web address into the region, automatically in response to a user launching the website mode GUI 702 while the web browser 110 is navigated to the website, and so forth.

The website mode GUI 702 further includes different configuration options for configuring website mode settings for a website identified in the website ID region 704, including:

Configuration option 706*a*—this option is selectable to cause a prompt for use instructions to be provided when a navigation to a particular website is initiated. Examples of different user prompts are discussed above, such as the mode GUIs 212*a*, 212*b*, 402.

Configuration option 706*b*—this option is selectable to apply default browsing mode for a particular website. A default browsing mode for a website can be specified in various ways, such as by the mode triggers 120 and/or the site DB 126 of the mode service 124.

Configuration option 706*c*—this option is selectable to specify that a normal browsing mode is to be used to navigate to a particular website.

Configuration option 706*d*—this option is selectable to specify that a private browsing mode is to be used to navigate to a particular website.

Configuration option 706*e*—this option is selectable to specify that a normal browsing mode is to be used to navigate to a particular website, and that site-related data for the website is to be deleted.

Configuration option 706*f*—this option is selectable to specify that a particular website is to be opened in a secure VM. Different implementations and attributes of opening a website in a secure VM are discussed above.

Configuration option 706*g*—this option is selectable to block a particular website.

The website mode GUI 702 further includes an apply control 708, which is selectable to apply different website mode settings specified in the website mode GUI 702.

According to various implementations, the settings specified in the different configuration options of the website mode GUI 702 are applied to a specific website. Thus, the website module GUI 702 enables custom browsing mode behaviors to be applied for different websites. In at least some implementations, a website mode behavior specified in the website mode GUI 702 for a particular website overrides a default mode behavior for the website, and/or overrides a risk level-related behavior specified in the triggers GUI 602.

Figure 8:
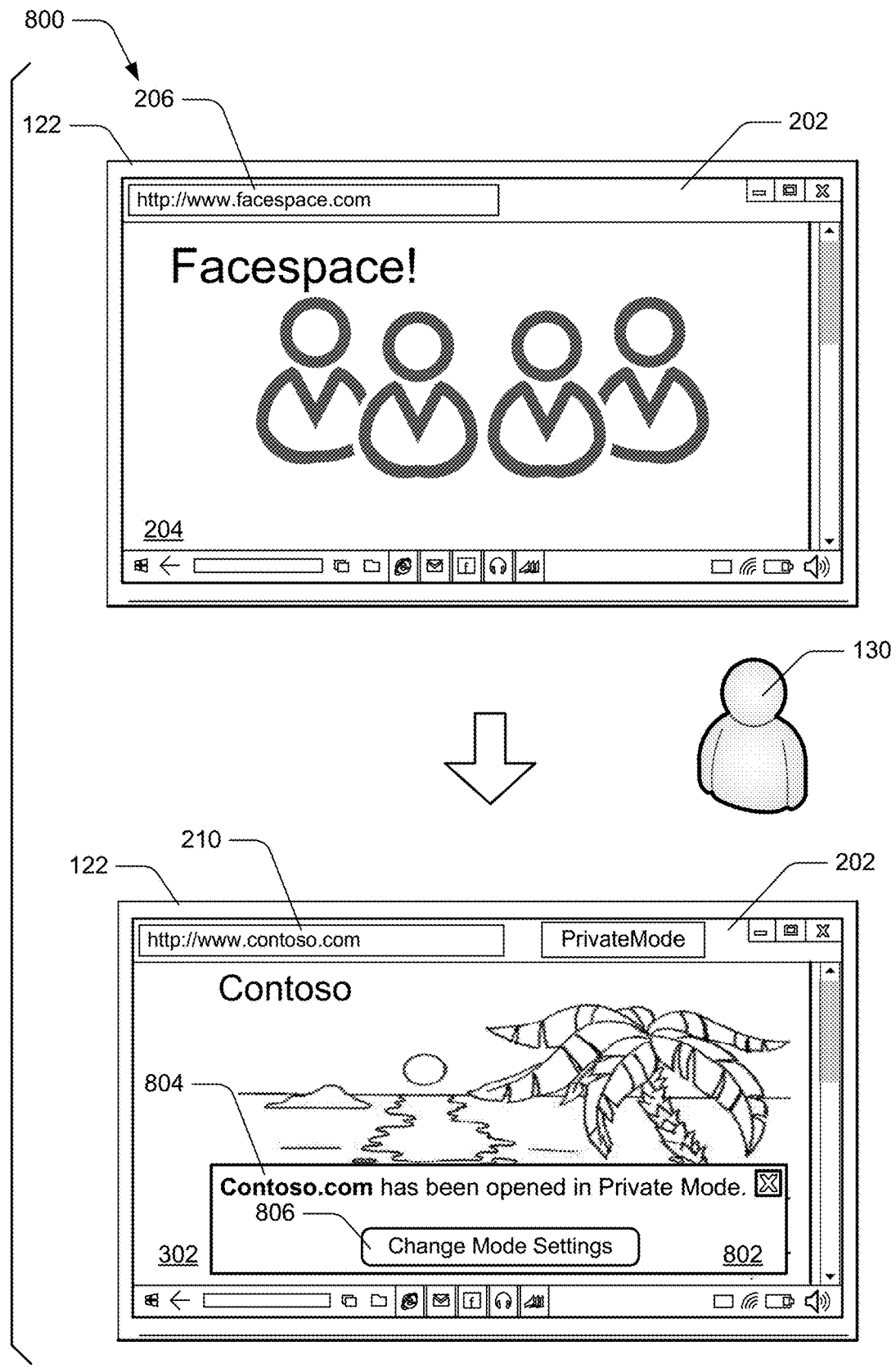
FIG. 8 depicts an example implementation scenario for automatically opening a website in a particular browsing mode in accordance with one or more embodiments.

FIG. 8 depicts an example implementation scenario 800 in accordance with one or more implementations. According to various implementations, the scenario 800 represents an example scenario for automatically opening a website in a particular browsing mode. The scenario 800, for instance, represents a continuation and/or variation of the scenarios 200-700 discussed above.

The upper portion of the scenario 800 includes the browser GUI 202 for the web browser 110 displayed on the display device 122 of the client device 102. The browser GUI 202 displays the web page 204 for the website 206. As discussed above, the website 206 is considered to be a safe site, and thus the website 206 is presented in a normal browsing mode.

Proceeding to the lower portion of the scenario 800, the user 130 initiates a navigation of the web browser 110 to the website 210. The website 210 is associated with a mode change trigger, and thus the web browser 110 switches to a different browsing mode and opens the webpage 302 for the website 210 in the different browsing mode. In this particular implementation the different browsing mode is a private browsing mode. However, a variety of different browsing modes may be employed, examples of which are discussed above. Generally, the website 210 can be associated with a mode change trigger in various ways, such as based on a default setting for the website 210, a setting provided by the mode service 124, a user specifying that the website 210 is to open in a particular browsing mode, and so forth. In this particular implementation, the web browser 110 switches to the private browsing mode and opens the website 210 in the private browsing mode automatically and in response to the request to navigate to the website 210.

In addition to navigating to the website 210 in the private browsing mode, a mode dialogue 802 is presented that includes a notification 804 that the website 210 is opened in the private browsing mode. In at least some implementations, the mode dialogue represents an optional notification that is not required. The mode dialogue 802 also includes a mode settings control 806 that is selectable to configure mode settings for the website 210 and/or the web browser 110. For instance, selecting the mode settings control 806 causes a configuration experience to be launched, such as one of the mode GUIs 212a, 212b, 402. In at least some implementations, the mode dialogue 802 is presented temporarily. For instance, the mode dialogue 802 is displayed when the web browser 110 navigates to the website 210, and the mode dialogue is automatically removed after a period of time elapses after initial display of the web page 302, e.g., 5 seconds.

Thus, the scenario 800 illustrates that various browsing mode settings can be automatically applied without requiring instruction from a user.

In at least some implementations, configuration settings provided in the various scenarios described above can be used to configure a user profile, such as the user profile 128a for the user 130. Further, the different configuration settings can be used to collect statistics regarding different websites, such as for updating the site DB 126. For instance, behavioral data describing user instructions and/or configuration settings provided in the different scenarios can be recorded by the mode service 124 and used to compile statistics that describe preferred mode-related behaviors for different websites and/or web content. Personally identifiable information (PII) may be removed from the behavioral data to prevent specific users from being linked to specific websites and/or specific browsing behaviors.

Having described some example implementation scenarios for automation of browsing mode switching, consider now a discussion of some example procedures in accordance with one or more embodiments.

Example Procedures

The following discussion describes some example procedures for projection via a device in accordance with one or more embodiments. The example procedures may be employed in the environment 100 of FIG. 1, the system 1300 of FIG. 13, and/or any other suitable environment. The procedures, for instance, represent procedures for implementing the example implementation scenarios discussed above. In at least some embodiments, the steps described for the various procedures can be implemented automatically and independent of user interaction.

Figure 9:
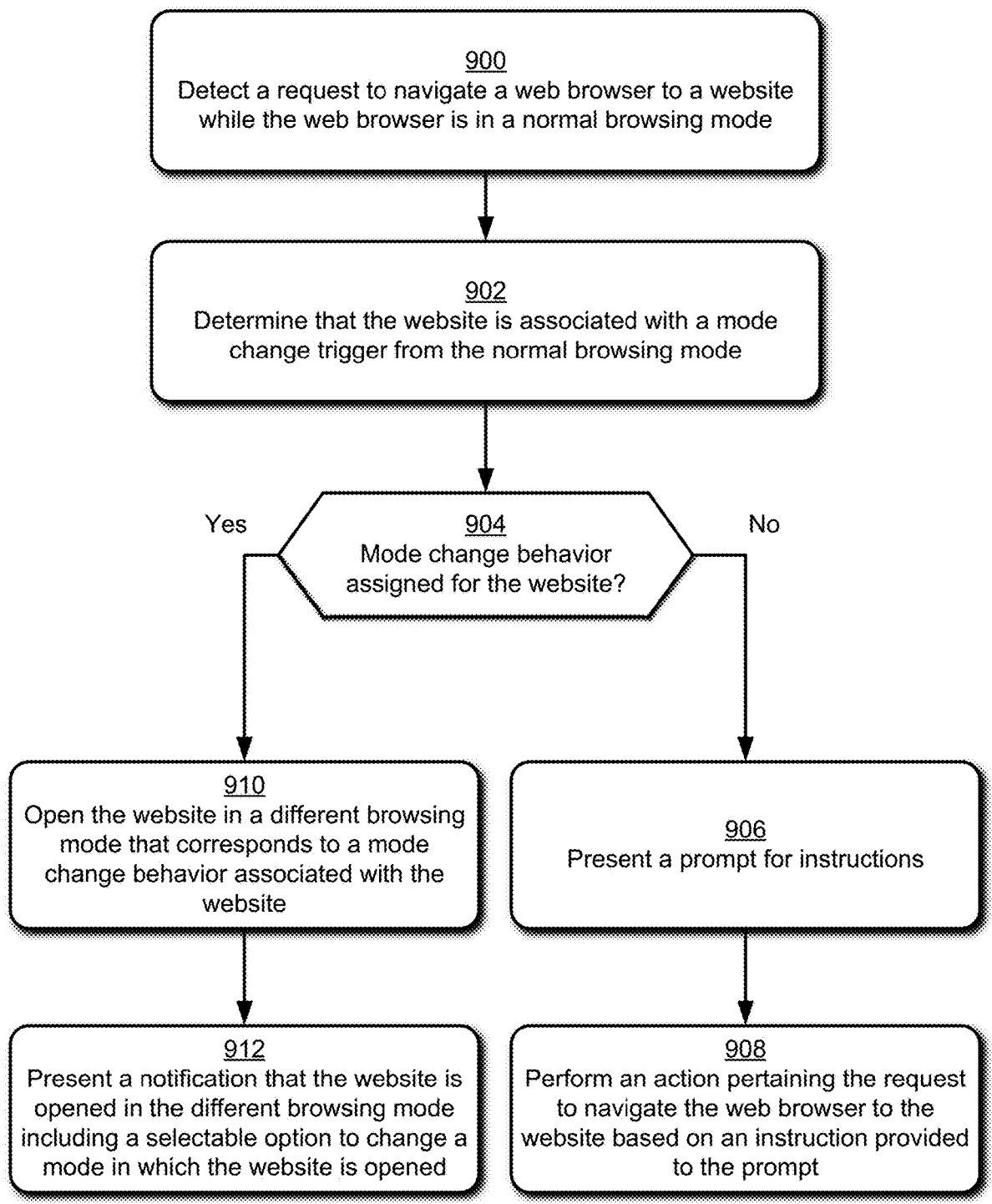
FIG. 9 is a flow diagram that describes steps in an example procedure for performing an action pertaining to a change in browsing modes in accordance with one or more embodiments.

FIG. 9 is a flow diagram that describes steps in a method in accordance with one or more embodiments. The method describes an example procedure for performing an action pertaining to a change in browsing modes in accordance with one or more implementations.

Step 900 detects a request to navigate a web browser to a website while the web browser is in a normal browsing mode. The web browser 110, for instance, detects a user action to initiate browsing to the website while the web browser 110 is in a normal browsing mode.

Step 902 determines that the website is associated with a mode change trigger from the normal browsing mode. For example, the mode module 118 determines that the website corresponds to a mode trigger 120. Alternatively or additionally, the mode service 124 determines that the website represents a mode change trigger, such as based on information from the site DB 126 and/or the user profiles 128. The website can be associated with a mode change trigger in various ways, such as based on a content type for the website, user configuration of the website as representing a mode change trigger, the mode service 124 categorizing the website as a mode change trigger, and so forth.

Step 904 ascertains whether a mode change behavior is assigned for the website. The mode module 118, for example, determines whether a mode change behavior is assigned, such as based on a default mode trigger 120, user configuration of a mode change behavior, a mode change behavior specified by the mode service 124, and so forth.

If a mode change behavior is not assigned ("No"), step 906 presents a prompt for instructions. For instance, the mode module 118 causes a user prompt for instructions regarding a possible change in browsing mode to be presented. Generally, the prompt includes different selectable options, such as different browsing mode options that usable to browse to the website. Examples of different prompts and selectable options are described above.

Step 908 performs an action pertaining the request to navigate the web browser to the website based on an instruction provided to the prompt. A user, for instance, provides input to the prompt indicating a particular behavior, such as a browsing mode to be used for browsing to the website. Thus, a navigation to the website in the specified browsing mode can be initiated. For example, the web browser 110 switches from a normal browsing mode to a different browsing mode, and navigates to the website in the different browsing mode. Examples of different browsing modes are detailed above.

Alternatively or additionally, a user can select an option to launch a mode configuration experience that enables configuration of one or more browsing mode settings pertaining to web browsing. Examples of different configuration experiences are described above.

If a mode change behavior is assigned ("Yes"), step 910 opens the website in a different browsing mode that corresponds to a mode change behavior associated with the website. The mode change behavior may be specified in various ways, such as based on a default behavior assigned by the mode module 118 and/or the mode service 124, a user-specified behavior, and so forth. Further, the mode change behavior may be associated with the website in various ways, such as based on a category of content presented by the website, an identity of a publisher of the website, an identity of the website itself, and so on. In at least some implementations, the web browser switches to the different browsing mode and navigates to the website in the different browsing mode automatically, responsive to said determining, and independent of user input after requesting navigation to the website.

Step 912 presents a notification that the website is opened in the different browsing mode including a selectable option to change a mode in which the website is opened. The notification, for instance, is presented within the web browser 110, such as adjacent to or overlaid on display of a web page of the website. In at least some implementations, the notification is presented responsive to opening the web page and independent of user input to present the notification.

Generally, the notification identifies the different browsing mode and specifies that the website is opened in the different browsing mode. The notification also includes a selectable option to change a browsing mode. The selectable option, for instance, is selectable to launch a configuration experience, examples of which are discussed above. The mode dialogue 802 discussed in the scenario 800 represents an example implementation of a suitable notification.

Figure 10:
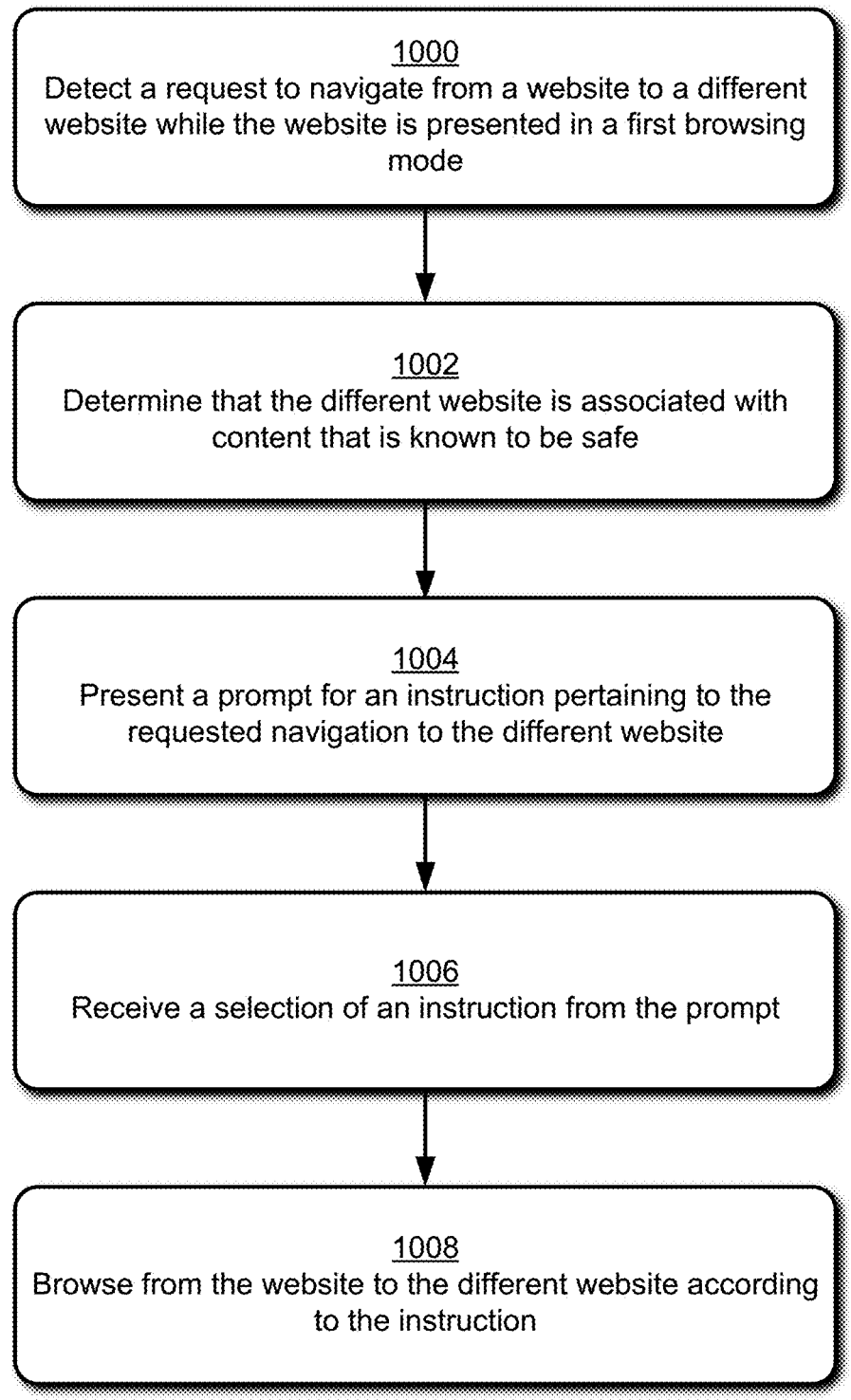
FIG. 10 is a flow diagram that describes steps in an example procedure for providing browsing mode options in accordance with one or more embodiments.

FIG. 10 is a flow diagram that describes steps in a method in accordance with one or more embodiments. The method describes an example procedure for providing browsing mode options in accordance with one or more implementations. In at least some implementations, the method represents an extension of the method described above with reference to FIG. 9.

Step 1000 detects a request to navigate from a website to a different website while the website is presented in a first browsing mode. For instance, while the web browser 110 is presenting a website (e.g., the website 210) in a private browsing mode, the user 130 provides input to browse to another website.

Step 1002 determines that the different website is associated with content that is known to be safe. Content of the website and/or the website itself, for example, is rated as being low risk of being associated with unsafe content.

Step 1004 presents a prompt for an instruction pertaining to the requested navigation to the different website. For instance, the mode module 118 causes a prompt to be presented the requests an instruction for browsing to the different website. The mode GUI 402 discussed above with reference to the scenario 400 represents one example prompt that can be presented. Generally, the prompt can include various selectable options, such as a selectable option to remain in the private browsing mode and navigate to the different website in the private browsing mode, a selectable option to switch to a normal browsing mode and navigate to the different website in the normal browsing mode, a selectable option to launch a configuration experience, and so forth.

Step 1006 receives a selection of an instruction from the prompt. The user 130, for instance, selects a particular selectable option from the mode GUI 402, which corresponds to an instruction pertaining to the requested navigation.

Step 1008 browses from the website to the different website according to the instruction. For instance, if the instruction specifies to switch to a different browsing mode, the web browser 110 switches to the different browsing mode and navigates to the different website. Alternatively, if the instruction specifies to stay in a current browsing mode, the web browser 110 browses to the different website in the current browsing mode. Thus, a user is given options for switching between different browsing modes when navigating between websites with different risk levels.

Figure 11:
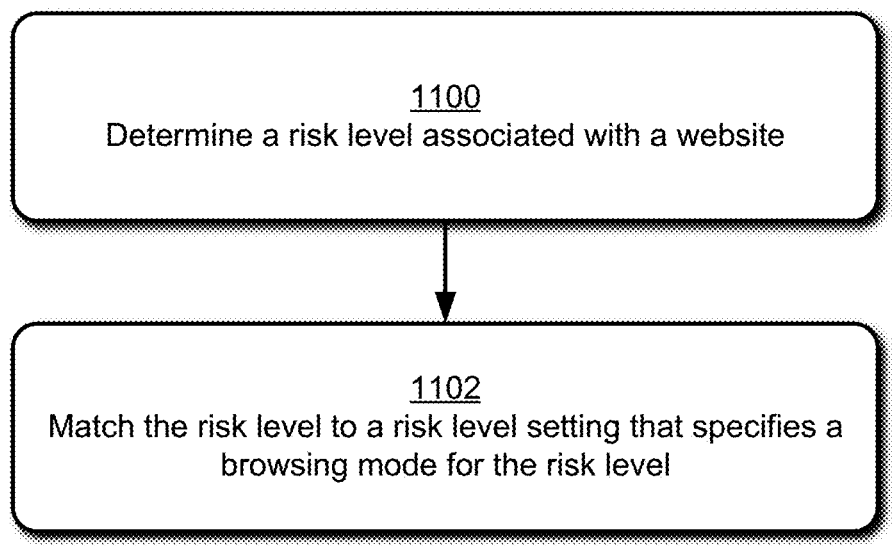
FIG. 11 is a flow diagram that describes steps in an example procedure for determining that a website is associated with content that represents a mode change trigger in accordance with one or more embodiments.

FIG. 11 is a flow diagram that describes steps in a method in accordance with one or more embodiments. The method describes an example procedure for determining that a website is associated with content that represents a mode change trigger in accordance with one or more implementations. In at least some implementations, the method represents an example implementation of step 902 of FIG. 9.

Step 1100 determines a risk level associated with a website. Generally, a risk level for a website may be determined in various ways. For instance, a network service such as a search engine and/or the mode service 124 may categorize different types of web content as being associated with different risk levels. Content with visually explicit adult content, for instance, may be categorized as high risk content. Content with profanity or socially controversial themes may be categorized as medium risk content, and family-oriented content may be categorized as low risk content.

Alternatively or additionally, a user can specify custom risk categorizations for different types of content, specific websites, specific web domains, and so forth.

Step 1102 matches the risk level to a risk level setting that specifies a browsing mode for the risk level. The risk level setting, for instance, specifies a particular browsing mode that is to be used for browsing to websites with the determined risk level. In at least some implementations, the particular browsing mode represents a different browsing mode than a current browsing mode, and thus a switch to the different browsing mode is implemented prior to browsing to the website.

Figure 12:
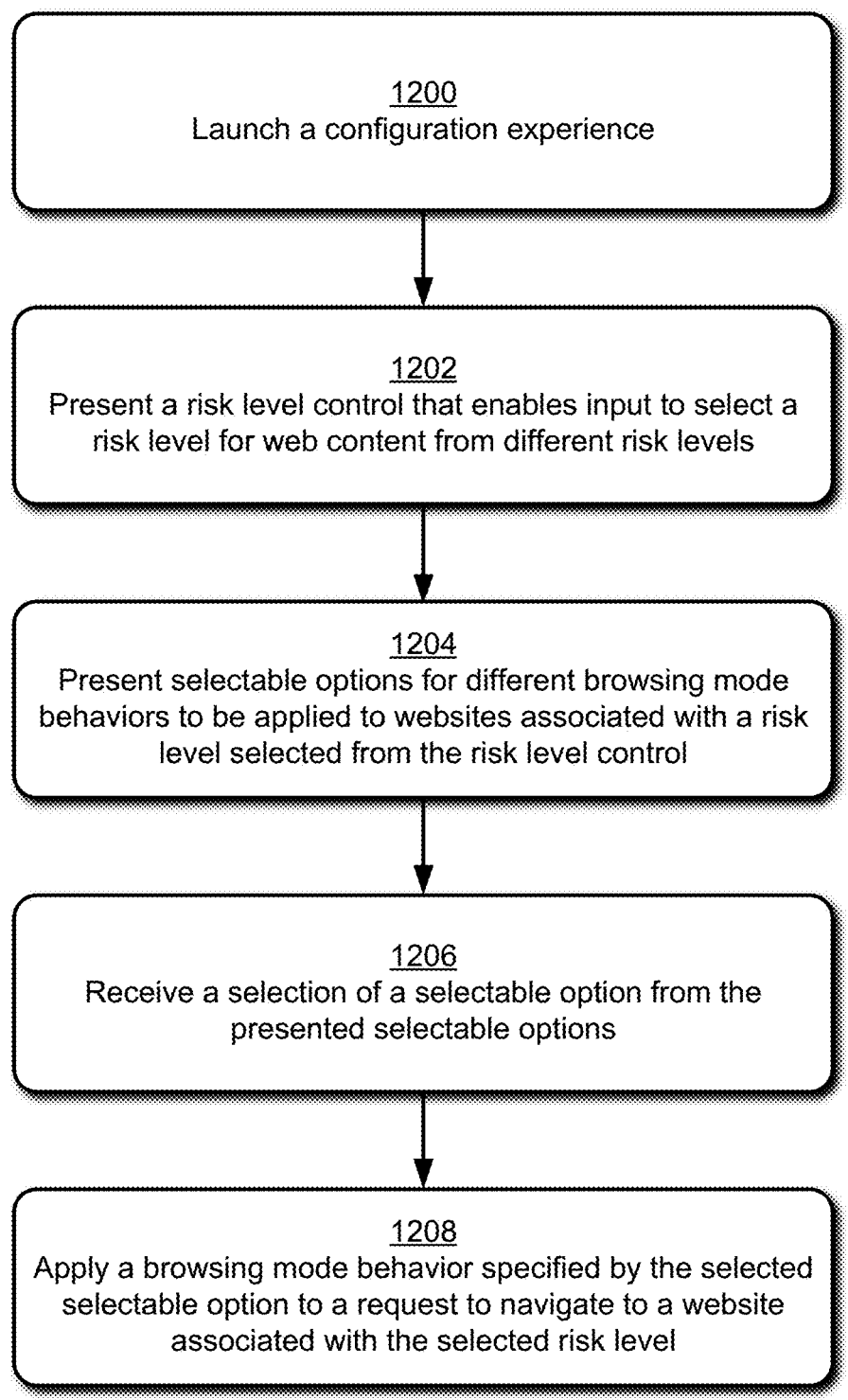
FIG. 12 is a flow diagram that describes steps in an example procedure for launching a configuration experience in accordance with one or more embodiments.

FIG. 12 is a flow diagram that describes steps in a method in accordance with one or more embodiments. The method describes an example procedure for launching a configuration experience in accordance with one or more implementations.

Step 1200 launches a configuration experience. Generally, the configuration experience enables configuration of one or more browsing mode settings pertaining to web browsing in browsing modes, examples of which are detailed throughout. The configuration experience may be launched in various ways, such as in response to user selection of a selectable option for launching the configuration experience, in response to a requested navigation to a website that represents a mode change trigger, in response to opening and/or authenticating with a web browser, and so forth.

Step 1202 presents a risk level control that enables input to select a risk level for web content from different risk levels. The different risk levels, for instance, pertain to a risk of a website being associated with unsafe subject matter. The risk level control 604 discussed above with reference to the scenario 600 represents an example of a suitable risk level control.

Step 1204 presents selectable options for different browsing mode behaviors to be applied to websites associated with a risk level selected from the risk level control. For example, the selectable options present different browsing modes that can be used to browse to websites associated with a selected risk level.

Step 1206 receives a selection of a selectable option from the presented selectable options. The user 130, for instance, selects a particular selectable option that corresponds to a particular browsing mode behavior, such as a browsing mode to be used for navigating to websites of the particular risk level.

Step 1208 applies a browsing mode behavior specified by the selected selectable option to a request to navigate to a website associated with the selected risk level. For example, when the user 130 requests navigation to a website that is rated as having the selected risk level, the browsing mode behavior is applied. In at least some implementations, this involves switching to a different browsing mode and browsing to the website in the different browsing mode. A variety of other behaviors and configuration settings may be specified and enforced from a configuration experience, examples of which are detailed above.

Accordingly, techniques for automation of browsing mode switching described herein enable automatic switching between browsing modes in response to a variety of different mode change triggers, and without requiring explicit user input to change browsing mode.

Having discussed some example procedures, consider now a discussion of an example system and device in accordance with one or more implementations.

Example System and Device

Figure 13:
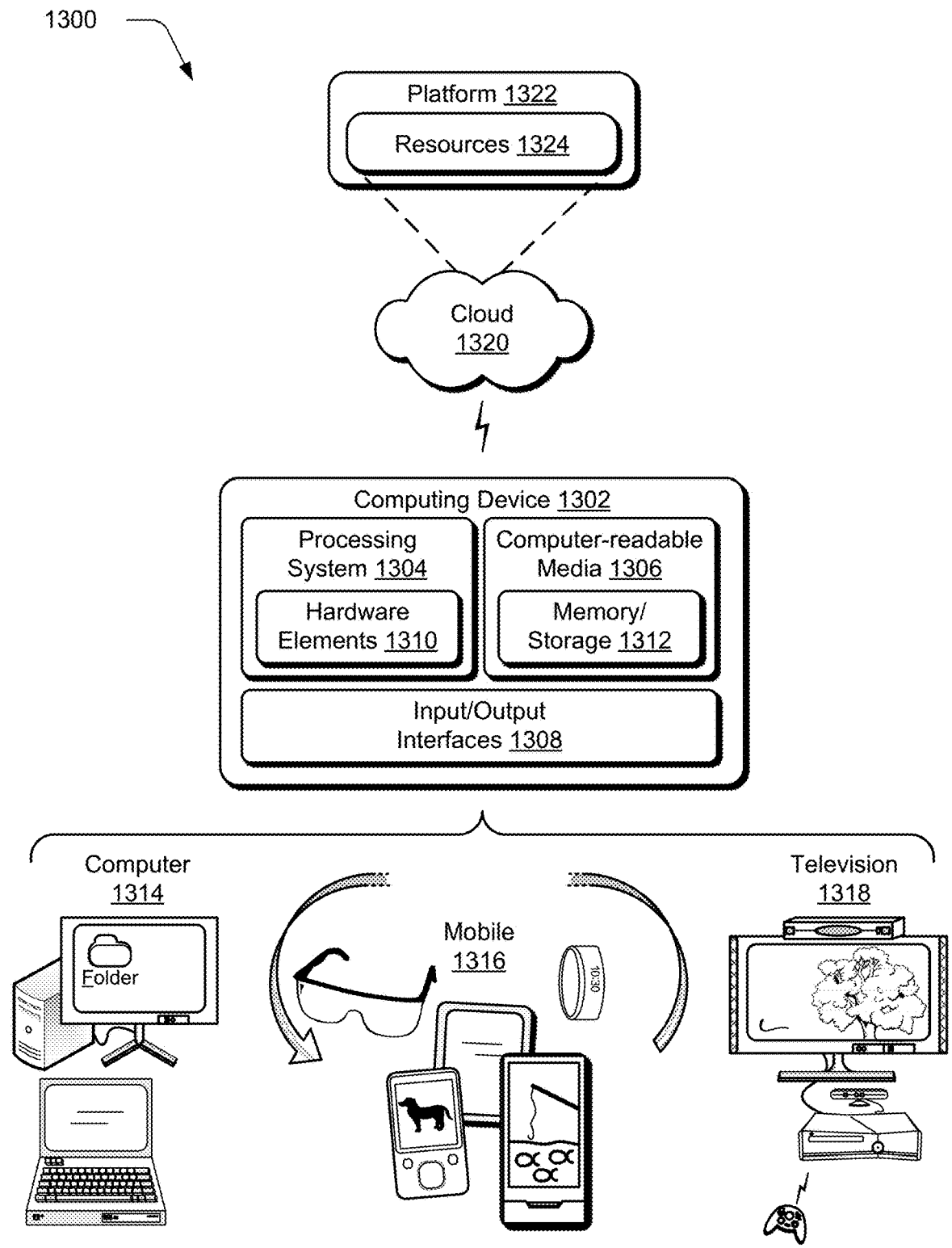
FIG. 13 illustrates an example system and computing device as described with reference to FIG. 1, which are configured to implement embodiments of techniques described herein.

FIG. 13 illustrates an example system generally at 1300 that includes an example computing device 1302 that is representative of one or more computing systems and/or devices that may implement various techniques described herein. For example, the client device 102 discussed above with reference to FIG. 1 can be embodied as the computing device 1302. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more Input/Output (I/O) Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1310 and computer-readable media 1306 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules that are executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a wearable device, a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. For example, functionalities discussed with reference to the client device 102 and/the mode service 124 may be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for enabling a browsing mode determination for a web browser, the system including: one or more processors; and one or more computer-readable storage media storing computer-executable instructions that, responsive to execution by the one or more processors, cause the system to perform operations including: detecting a request to navigate a web browser to a website while the web browser is in a normal browsing mode; determining that the website is associated with content that represents a mode change trigger from the normal browsing mode to a private browsing mode; presenting a prompt for an instruction, the prompt including: a first selectable option to switch to the private browsing mode and navigate to the website in the private browsing mode; and a second selectable option to navigate to the website in the normal browsing mode and to delete site-related data for the website after browsing of the website is terminated; and performing an action pertaining the request to navigate the web browser to the website based on an instruction provided to the prompt.

Example 2

A system as described in example 1, wherein said determining is based on user behavior data collected from multiple users indicating that the website is associated with unsafe content.

Example 3

A system as described in one or more of examples 1 or 2, wherein said determining is based on a web service indicating that the website is associated with unsafe content.

Example 4

A system as described in one or more of examples 1-3, wherein said determining is based on the website including protected enterprise data.

Example 5

A system as described in one or more of examples 1-4, wherein the prompt further includes a third selectable option to open the website in a secure virtual machine.

Example 6

A system as described in one or more of examples 1-5, wherein the prompt further includes a third selectable option that is selectable to cause a secure virtual machine to be instantiated, and the website to be opened in the secure virtual machine.

Example 7

A system as described in one or more of examples 1-6, wherein said performing an action includes switching to the private browsing mode and navigating to the website in the private browsing mode in response to receiving selection of the first selectable option, and wherein the operations further include: detecting a request to navigate from the website to a different website; determining that the different website is associated with content that is known to be safe; presenting a different prompt for instruction pertaining the requested navigation to the website, the different prompt including: a third selectable option that is selectable to remain in the private browsing mode and navigate to the different website in the private browsing mode; and a fourth selectable option that is selectable to switch to the normal browsing mode and navigate to the different website in the normal browsing mode.

Example 8

A system as described in one or more of examples 1-7, wherein the prompt further includes a third selectable option to launch a configuration experience for configuration of one or more browsing mode settings pertaining to web browsing in either the normal browsing mode or the private browsing mode, the configuration experience including: a risk level control that enables input to select a risk level for web content, the risk level pertaining to a risk of a website being associated with unsafe subject matter; and selectable options for different browsing mode behaviors to be applied to websites associated with a risk level selected from the risk level control.

Example 9

A system as described in one or more of examples 1-8, wherein the prompt further includes a third selectable option to launch a configuration experience for configuration of one or more browsing mode settings pertaining to web browsing in either the normal browsing mode or the private browsing mode, the configuration experience including a selectable option to allow the web browser to interface with a remote service to obtain mode-related data for configuring the browsing mode settings.

Example 10

A computer-implemented method for changing browsing modes for a web browser in response to a mode change trigger, the method including: detecting a request to navigate a web browser to a website while the web browser is in a normal browsing mode; determining that the website is associated with content that represents a mode change trigger from the normal browsing mode; opening, automatically and responsive to said determining, the website in a different browsing mode that corresponds to a mode change behavior associated with the website; and presenting, responsive to said opening, a notification that the website is opened in the different browsing mode including a selectable option to change a mode in which the website is opened.

Example 11

A method as described in example 10, wherein the different browsing mode includes one of a private browsing mode, a normal browsing mode in which site-related data for the website is to be deleted, or a browsing mode in which the website to be opened in a secure virtual machine.

Example 12

A method as described in one or more of examples 10 or 11, wherein said determining includes: determining a risk level associated with the website; and matching the risk level to a risk level setting that specifies a browsing mode for the risk level, said comparing indicating that websites associated with the risk level are to be opened in the different browsing mode.

Example 13

A method as described in one or more of examples 10-12, wherein said determining is based on statistical data that indicates that a majority of users that visit the website do so in the different browsing mode.

Example 14

A method as described in one or more of examples 10-13, further including: receiving a selection of the selectable option; and launching a configuration experience that is specific to the website and that enables a mode setting for the website to be configured.

Example 15

A method as described in one or more of examples 10-14, further including: receiving a selection of the selectable option; and launching a configuration experience that enables one or more mode settings for the web browser to be configured.

Example 16

A method for providing a configuration experience for browsing mode settings, the method including: launching a configuration experience that enables configuration of one or more browsing mode settings pertaining to web browsing in browsing modes including a normal browsing mode and a private browsing mode; presenting a risk level control that enables input to select a risk level for web content from different risk levels, the risk level pertaining to a risk of a website being associated with unsafe subject matter; presenting selectable options for different browsing mode behaviors to be applied to websites associated with a risk level selected from the risk level control; receiving a selection of a selectable option from the presented selectable options; and applying a browsing mode behavior specified by the selected selectable option to a request to navigate to a website associated with the selected risk level.

Example 17

A method as described in example 16, wherein the configuration experience is launched within the web browser.

Example 18

A method as described in one or more of examples 16 or 17, wherein the selectable options include: a first selectable option to navigate to the websites associated with the selected risk level in the normal browsing mode and to delete site-related data for the websites; and a second selectable option to navigate to the websites associated with the selected risk level within a secure virtual machine.

Example 19

A method as described in one or more of examples 16-18, wherein the selectable options include a selectable option to allow the web browser to interface with a remote mode service to obtain mode-related data.

Example 20

A method as described in one or more of examples 16-19, wherein the selectable options include a selectable option to allow a remote mode service to collect mode-related data from the web browser.

CONCLUSION

Techniques for automation of browsing mode switching are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
one or more processors; and
one or more computer-readable storage media storing computer-executable instructions that, responsive to execution by the one or more processors, cause the one or more processors to perform operations including:
detecting a request to navigate a web browser to a website while the web browser is in a normal browsing mode;
determining that the website is associated with content that represents a mode change trigger from the normal browsing mode to a private browsing mode;
presenting a prompt for an instruction, the prompt including:
a first selectable option to switch to the private browsing mode and navigate to the website in the private browsing mode;
a second selectable option to navigate to the website in the normal browsing mode and to delete site-related data for the website when the web browser navigates to a different website, wherein the deleted site-related data from the normal browsing mode comprises cached data for the website and browsing history data identifying the website; and
a third selectable option to launch a configuration experience for configuration of one or more browsing mode settings pertaining to web browsing in either the normal browsing mode or the private browsing mode, the configuration experience including:
a risk level control that enables input to select a risk level from a plurality of risk levels for web content, the risk level pertaining to a risk of a website being associated with unsafe subject matter; and
selectable options for different browsing mode behaviors to be applied to websites associated with a risk level selected from the risk level control; and
performing an action pertaining to the request to navigate the web browser to the website based on an instruction provided to the prompt.

2. The system as described in claim 1, wherein said determining is based on user behavior data collected from multiple users indicating that the website is associated with unsafe content.

3. The system as described in claim 1, wherein said determining is based on a web service indicating that the website is associated with unsafe content.

4. The system as described in claim 1, wherein said determining is based on the website including protected enterprise data.

5. The system as described in claim 1, wherein the prompt further includes a third selectable option to open the website in a secure virtual machine.

6. The system as described in claim 1, wherein the prompt further includes a third selectable option that is selectable to cause a secure virtual machine to be instantiated, and the website to be opened in the secure virtual machine.

7. The system as described in claim 1, wherein said performing an action comprises switching to the private browsing mode and navigating to the website in the private browsing mode in response to receiving selection of the first selectable option, and wherein the operations further include:
detecting a request to navigate from the website to a different website;
determining that the different website is associated with content that is known to be safe;

presenting a different prompt for instruction pertaining the requested navigation to the website, the different prompt including:
   a third selectable option that is selectable to remain in the private browsing mode and navigate to the different website in the private browsing mode; and
   a fourth selectable option that is selectable to switch to the normal browsing mode and navigate to the different website in the normal browsing mode.

8. The system as described in claim 1, wherein the prompt further includes a third selectable option to launch a configuration experience for configuration of one or more browsing mode settings pertaining to web browsing in either the normal browsing mode or the private browsing mode, the configuration experience including a selectable option to allow the web browser to interface with a remote service to obtain mode-related data for configuring the browsing mode settings.

9. A computer-implemented method, comprising:
   detecting a request to navigate a web browser to a website while the web browser is in a normal browsing mode;
   determining that the website is associated with content that represents a mode change trigger from the normal browsing mode based on a selected risk level from a risk level control that pertains to a risk of a website being associated with unsafe subject matter;
   opening, automatically and responsive to said determining, the website in a different browsing mode that corresponds to a mode change behavior associated with the website;
   presenting, responsive to said opening, a notification that the website is opened in the different browsing mode including a selectable option to change a mode in which the website is opened, wherein data from the website is cached and browsing history data identifying the website is saved during browsing in the different browsing mode;
   navigating to a different website; and
   deleting, based on navigating to the different website, site-related data for the website comprising data from the website that was cached and browsing history data identifying the website.

10. A method as recited in claim 9, wherein the different browsing mode comprises one of a private browsing mode, a normal browsing mode in which site-related data for the website is to be deleted, or a browsing mode in which the website to be opened in a secure virtual machine.

11. A method as recited in claim 9, wherein said determining comprises:
   determining a risk level from a plurality of risk levels associated with the website; and
   matching the risk level to a risk level setting that specifies a browsing mode for the risk level, said comparing indicating that websites associated with the risk level are to be opened in the different browsing mode.

12. A method as recited in claim 9, wherein said determining is based on statistical data that indicates that a majority of users that visit the website do so in the different browsing mode.

13. A method as recited in claim 9, further comprising:
receiving a selection of the selectable option; and
launching a configuration experience that is specific to the website and that enables a mode setting for the website to be configured.

14. A method as recited in claim 9, further comprising:
receiving a selection of the selectable option; and
launching a configuration experience that enables one or more mode settings for the web browser to be configured.

15. A method comprising:
   launching a configuration experience that enables configuration of one or more browsing mode settings pertaining to web browsing in browsing modes including a normal browsing mode in which data from websites is cached and browsing history data identifying websites is saved and a private browsing mode in which data for websites is not cached and browsing history data identifying websites is not saved;
   presenting a risk level control that enables input to select a risk level for web content from a plurality of different risk levels, the risk level pertaining to a risk of a website being associated with unsafe subject matter;
   presenting selectable options for different browsing mode behaviors to be applied to websites associated with a risk level selected from the risk level control, wherein the selectable options include: a first selectable option to navigate to the websites associated with the selected risk level in the normal browsing mode and to delete site-related data for the websites when the web browser navigates to a different website;
   receiving a selection of a selectable option from the presented selectable options; and
   applying a browsing mode behavior specified by the selected selectable option to a request to navigate to a website associated with the selected risk level.

16. A method as recited in claim 15, wherein the configuration experience is launched within the web browser.

17. A method as recited in claim 15, wherein the selectable options include:
   a first selectable option to navigate to the websites associated with the selected risk level in the normal browsing mode and to delete site-related data for the websites; and
   a second selectable option to navigate to the websites associated with the selected risk level within a secure virtual machine.

18. A method as recited in claim 15, wherein the selectable options include a selectable option to allow the web browser to interface with a remote mode service to obtain mode-related data.

19. A method as recited in claim 15, wherein the selectable options include a selectable option to allow a remote mode service to collect mode-related data from the web browser.

* * * * *